United States Patent [19]

Koiwa

[11] Patent Number: 5,035,261

[45] Date of Patent: Jul. 30, 1991

[54] PUMP AND VALVE APPARATUS

[75] Inventor: Yoshinobu Koiwa, Chiba, Japan

[73] Assignees: Yoshinobu Koiwa; Kabushiki Kaisha Little Rock, both of Chiba; Kelbin Co., Ltd., Tokyo; Shuichi Fujimori, Fujishawa, all of Japan

[21] Appl. No.: 513,858

[22] Filed: Apr. 23, 1990

Related U.S. Application Data

[62] Division of Ser. No. 247,869, Sep. 21, 1988, Pat. No. 4,948,349.

[30] Foreign Application Priority Data

Sep. 22, 1987 [JP] Japan .................... 62-237996

[51] Int. Cl.⁵ ............................................. F16K 15/04
[52] U.S. Cl. ............................. 137/516.11; 137/539.5
[58] Field of Search .................. 137/516.11, 539, 539.5

[56] References Cited

U.S. PATENT DOCUMENTS

| | | |
|---|---|---|
| 1,564,507 | 12/1925 | Barker .................... 137/539 |
| 1,764,712 | 6/1930 | Brackett et al. . |
| 2,413,851 | 1/1947 | Taylor . |
| 2,807,215 | 9/1957 | Hawxhurst . |
| 2,856,857 | 10/1958 | Saalfrank . |
| 2,902,944 | 9/1959 | Etten . |
| 3,080,820 | 3/1963 | Browne . |
| 3,323,461 | 6/1967 | Bennett . |
| 3,507,583 | 4/1970 | James . |
| 3,520,643 | 7/1970 | Busse et al. . |
| 3,749,522 | 7/1973 | Kazama et al. . |
| 4,047,850 | 9/1977 | Berthelot . |
| 4,286,622 | 9/1981 | Ninomiya ............... 137/539 X |
| 4,430,048 | 2/1984 | Fritsch . |
| 4,667,575 | 5/1987 | Lundquist . |
| 4,702,272 | 10/1987 | MacGuire ............ 137/516.11 X |
| 4,778,347 | 10/1988 | Mize . |

FOREIGN PATENT DOCUMENTS

| | | | |
|---|---|---|---|
| 805006 | 5/1951 | Fed. Rep. of Germany ...... 417/383 |
| 3121851 | 12/1981 | Fed. Rep. of Germany . |
| 112751 | 1/1918 | United Kingdom ........... 137/516.11 |

Primary Examiner—Robert G. Nilson

[57] ABSTRACT

A pump consists of a valve box in which a valve chamber inlet and outlet are each provided with a valve, and reciprocating member in a cylinder that communicates with the valve chamber of the valve box to open the valves. A pressure action chamber is provided between the valve box and the cylinder and a pressure force member divides the pressure action chamber into a valve chamber side and a cylinder side. On the cylinder side of the pressure action chamber thus divided is an action medium that transmits to the pressure force member changes in the volume of the pressure action chamber produced by the action of the reciprocating member. A valve device consists of a concave valve seat and a number of fluid passages formed therein which open into the said concavity. Either the valve seat or the valve-piece is formed of, or covered with, a hard resilient material, or one is formed of the hard resilient material and the other is covered with a hard resilient material. The valve seat and valve-piece may also be made of wood.

48 Claims, 7 Drawing Sheets

FIG. 2
FIG. 3
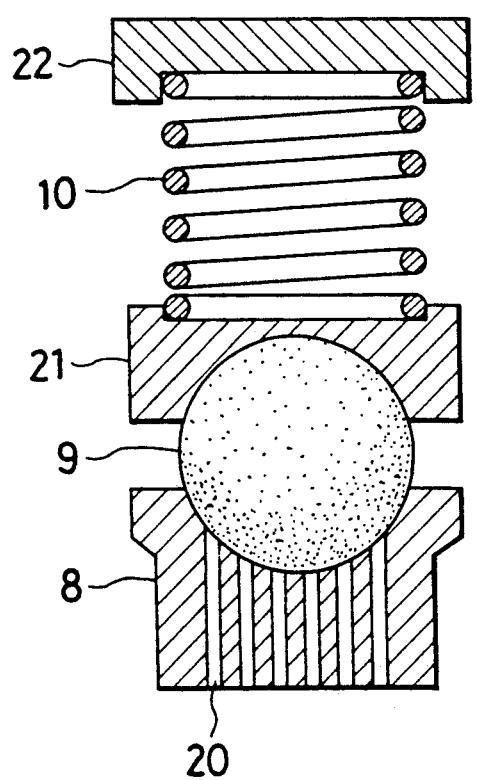
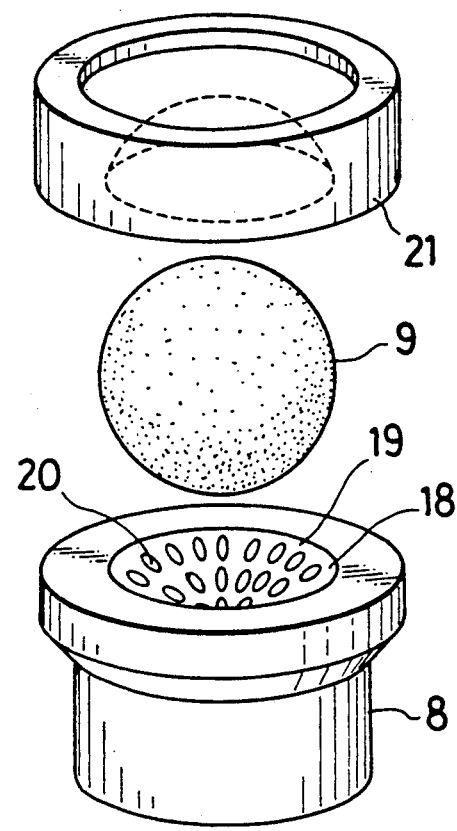

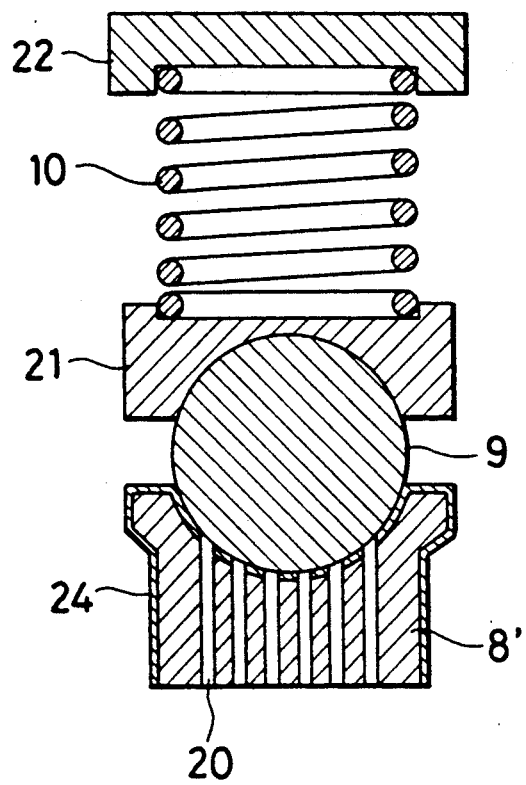
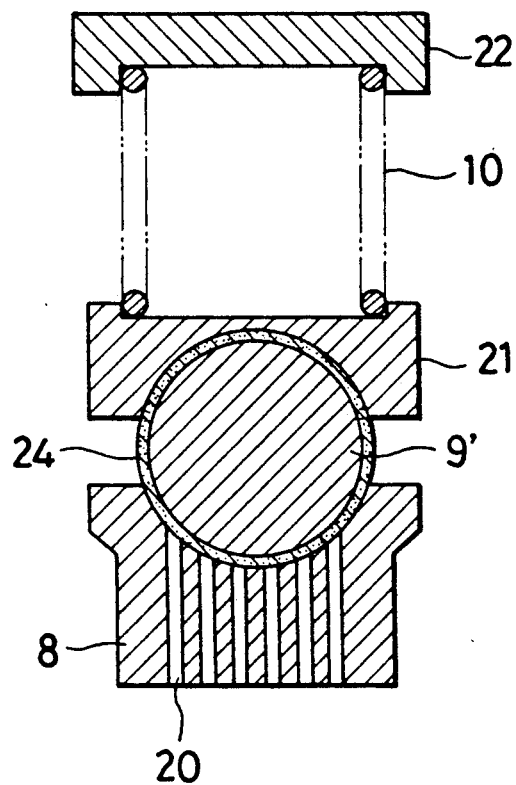
FIG. 4
FIG. 5

FIG. 6
FIG. 7
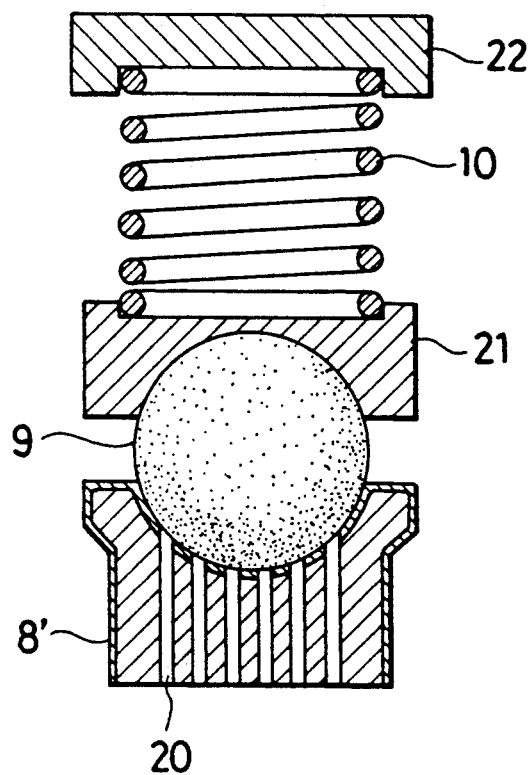
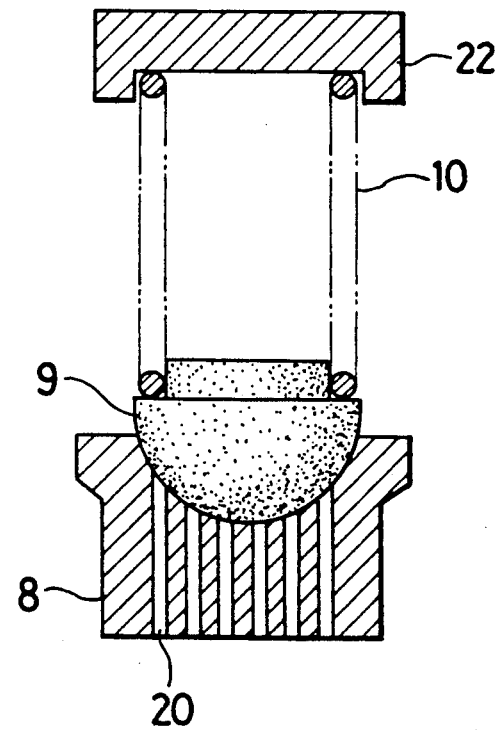

FIG. 8
BACKGROUND ART
FIG. 9
BACKGROUND ART
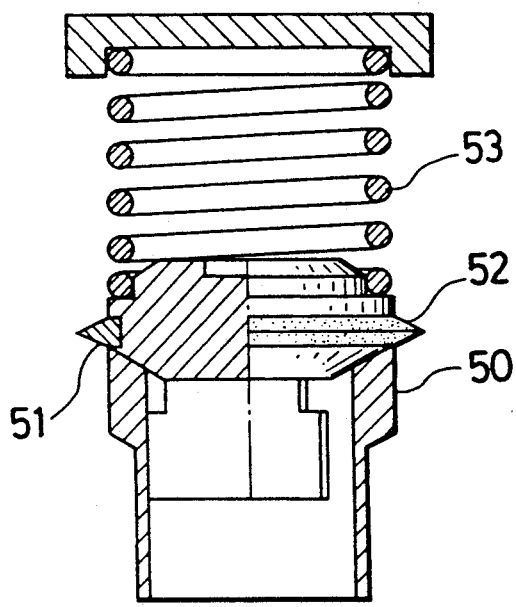
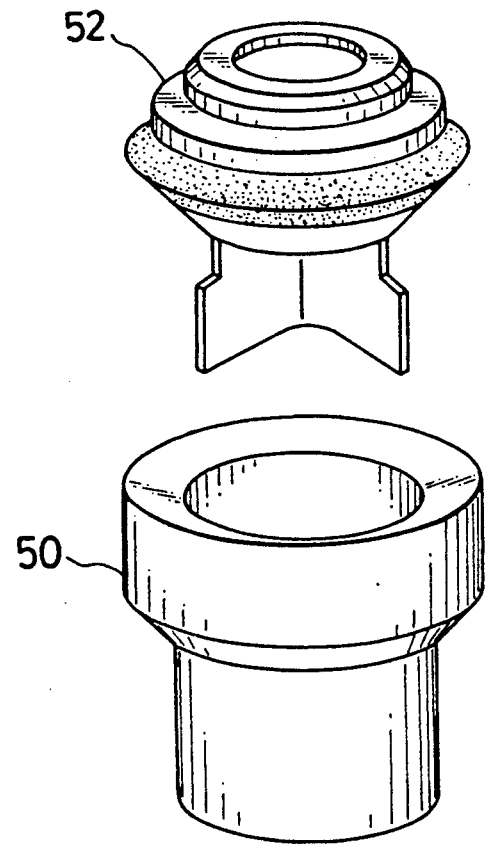

PUMP AND VALVE APPARATUS

This application is a division of copending application Ser. No. 247,869, filed on Sept. 21, 1988, now U.S. Pat. No. 4,948,349.

BACKGROUND OF THE INVENTION

1. Field of the Invention

This invention relates to a pump and valve apparatus that provides a reliable valve opening and closing operation with improved durability.

2. Description of the Prior Art

Pumps in use include reciprocating pumps in which the reciprocating action of a piston is used to open and close a valve and pressure-feed a fluid such as water, for example. Such reciprocating pumps are divided into three types according to the form of piston used: the bucket type, the plunger type and the piston type.

As shown in FIG. 12, bucket type pumps have a hole 102 in the piston 101 that slides in a cylinder 100. The hole 102 and the cylinder outlet 103 are provided with respective valves 104 and 105. The piston 101 is caused to move reciprocally via a piston rod 106. The descent of the piston 101 opens the valve 104 and closes valve 105, drawing water through the hole 102 to the upper part of the cylinder 100. This water in the upper part of the cylinder 100 is then sent out under pressure by the rise of the piston 101.

Plunger type pumps, such as shown in FIG. 13, are generally used for high-pressure applications. Water, for example, in the cylinder 107 is forced under pressure out of the cylinder outlet 108' by the insertion of the plunger 108 into the cylinder 107.

FIG. 14 shows a piston type pump in which the movement of a piston 111 driven by a crank mechanism 109 inside a cylinder 110 opens and closes valves 112 and 113 to feed out the water under pressure.

These types of reciprocating pumps use various types of packing, for example rubber, to obtain a watertight seal between the piston and the cylinder. In the bucket type pump, packing is provided between the cylinder 100 and the piston rod 106, and in the plunger type pump the cylinder 107 and plunger, 108 are each provided with a packing therebetween. On the piston type pumps, piston rings are provided around the circumference of the piston 111.

When these types of conventional reciprocating pumps, especially plunger type pumps, are used to pump fluids containing granular material, such as in a cement mill, the motion of the plunger is accompanied by a rubbing of the particles against the packing, which causes the packing to wear rapidly. This has necessitated replacing packings at short intervals, which reduces operating efficiency and shortens the working life of the pump itself. On piston pumps, the piston rings wear and can cause damage to the internal surface of the cylinder.

Various types of valves are used as means of limiting or controlling the fluid flow. FIGS. 8 and 9 show a valve device used on plunger type pumps which are well-known as pumps for high-pressure applications. These valve devices are comprised of a tubular valve seat 50, a valve-piece 52 provided with a surrounding flange 51, and a valve spring 53 which presses the valve-piece 52 towards the valve seat 50. With plunger type pumps used to pump materials such as cement clinker, for example, as the valve-piece 52 of the conventional valve devices opens and closes, solid bodies contained in the fluid can be caught between the valve-piece 52 and the valve seat 50.

Because the valve seats 50 used in conventional valve devices are tubular members, solid bodies readily pass therethrough, in addition to which as the valve seat 50 and the valve-piece 52 are made of metal, the valve operation is not always reliable if solid bodies are caught therebetween. This can make it impossible to pump constant quantities of fluid at fixed intervals, so use of the pump was accompanied by a lowering of the operating efficiency. Furthermore, solid bodies caught between the valve seat 50 and the valve-piece 52 could cause damage to the seat and valve-piece, resulting in fluid leaking out of the gap between them. Conventionally, therefore, the valve device has had to be replaced at this point, interrupting operations.

SUMMARY OF THE INVENTION

An object of the present invention is to provide a pump and valve apparatus that offers reliable valve operation with improved durability.

To achieve this object, according to the present invention, in a pump apparatus comprised of a valve box in which a valve chamber inlet and outlet are each provided with a valve, and a reciprocating member which moves reciprocally in a cylinder that communicates with the valve chamber of the valve box to open the said valves, a pressure action chamber is provided between the valve box and the cylinder and a pressure force member divides the pressure action chamber into a valve chamber side and a cylinder side, and contained on the cylinder side of the pressure action chamber divided by the pressure force member is an action medium that transmits to the pressure force member changes in volume of the pressure action chamber produced by the action of the reciprocating member.

The invention also comprises a valve device comprising a valve seat the seating portion of which is formed as a recess corresponding to a spherical surface; a prescribed number of fluid passages formed therein opening into the recess; a valve-piece having a surface corresponding to the valve seat recess; and a valve spring that resiliently maintains the valve-piece on the concave surface of the valve seat; wherein at least one of the valve seat and valve-piece is formed of, or covered with, a hard resilient material, or one is formed of a hard resilient material and the other is covered with a hard resilient material. In addition, the valve seat and valve-piece may be made of wood instead of the hard resilient material.

The suction effect of the reciprocating member causes the volume enclosed by the pressure force member to contract by a set amount, which produces a negative pressure in the valve chamber that opens the valve on the inlet side, drawing fluid into the interior of the valve chamber. When the reciprocating member performs an expulsion action, the pressure force member is expanded, via the action medium, by the volume of the expulsion movement of the reciprocating member. As a result, the outlet-side valve opens and an amount of fluid is fed out that is the amount of the change in volume of the pressure action chamber.

The fluid passages formed in the valve seat are small, which makes it hard for solid bodies to pass therethrough. Even if solid bodies should pass through the fluid passages and get caught between the valve seat and the valve-piece, the resilience of the valve seat and/or the valve-piece ensure that such solid bodies do not interfere with the action of the valves.

The above and other features of the invention will become apparent from the description below made with reference to the following drawings. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 2 is a cross-sectional view of the valve device shown in FIG. 1;

FIG. 3 is a perspective view of the valve device;

FIGS. 4 to 7 are cross-sectional views of other embodiments of the invention;

FIG. 8 is a cross-sectional view of a conventional valve device;

FIG. 9 is a perspective view of a conventional valve device;

DETAILED DESCRIPTION OF THE PREFERRED EMBODIMENTS

Figure 1:
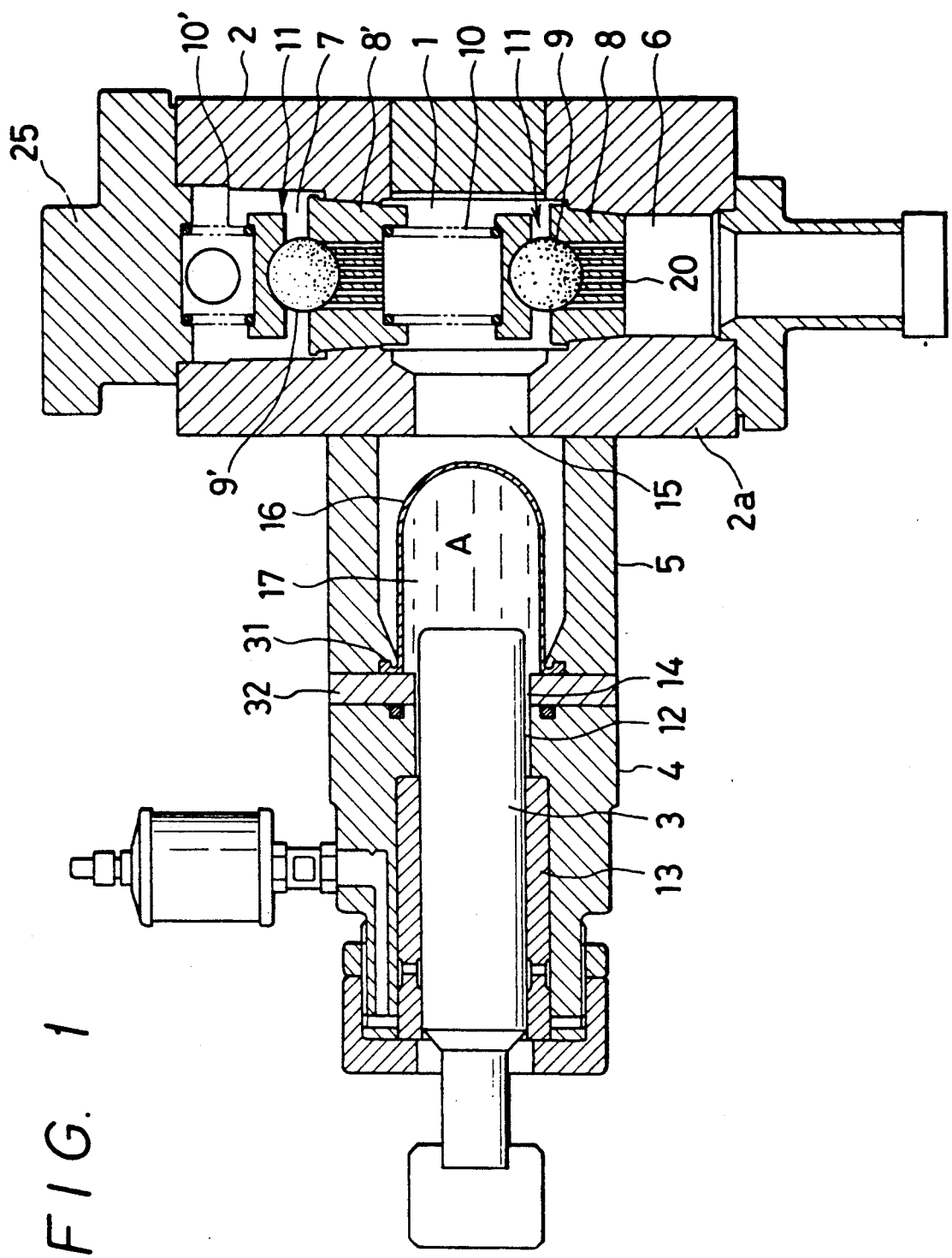
FIG. 1 is a cross-sectional view of an embodiment of the valve device according to the present invention applied to a plunger pump.

FIG. 1 is a sectional view of an embodiment of a plunger type pump according to the present invention. This pump apparatus is comprised of a valve box 2 provided with a valve chamber 1, a plunger box 4 provided with a plunger 3, and a pressure action chamber 5 disposed between the valve box 2 and the plunger box 4. The valve box 2 is provided with a valve device 11 comprised of valve chamber 1, inlet 6 and outlet 7, a valve seat 8, a valve-piece 9 and valve spring 10, which are described later. The plunger 3 is disposed, via a plurality of V-shaped packings 13, within a cylinder 12 in the plunger box 4 and is slidably operated by a drive means (not illustrated). In the suction process the plunger 3 is contained in the cylinder 12, and in the expulsion process part of the plunger 3 is caused to project from the opening 14 of the cylinder 12 into the pressure action chamber 5.

The pressure action chamber 5 is provided between an opening 15 provided in the wall of the valve chamber 1 of the valve box 2 and the cylinder opening 14 of the plunger box 4. In the pressure action chamber 5, a resilient membrane 16 made of sheet rubber, for example, is provided to form a pressure force member that divides the pressure action chamber 5 into a valve box 2 side and a plunger box 4 side. The enclosed cylinder-side action chamber A formed by the partitioning resilient membrane 16 is filled with an action medium 17 such as oil, for example.

The valve seat 8, valve-piece 9 and valve spring 10 that form the valve device 11 will now be described with reference to FIGS. 2 and 3. The valve seat 8 has a valve seating portion 18 with a concave surface 19 that corresponds to part of a spherical surface, and is also provided with a number of fluid passages 20 that extend axially to open into the concave surface 19. The number and diameter of the fluid passages 20 are determined beforehand to be values that ensure the achievement of the required flow application. The transverse section of the fluid passages 20 may be reticular or slit-shaped, as required.

The valve-piece 9 is spherical in shape and is formed from a hard resilient material such as hard rubber or synthetic resin. The diameter of the valve-piece 9 is such that it fits the concave surface 19 or is slightly larger.

The valve seat 8 as well as the valve-piece 9 may also be formed of a hard resilient material, or the valve seat 8 alone may be formed of a hard resilient material.

The valve spring 10 is provided between the valve cover 21 and a spring retainer 22, for example, or the inner wall of the valve box 2, and urges the valve-piece 9 towards the valve seat 8 with a constant force.

The operation of plunger pump provided with the above valve device 11 will now be described. When in the course of the suction process the plunger 3 is moved to the left, with reference to the drawing, the resilient membrane 16 contracts by the amount of change in volume caused by the suction action of the plunger 3. This produces a negative pressure in chamber 1, forcing open the valve-piece 9 against the resistance of the valve spring 10, and the fluid substance flows into the valve chamber 1 via the fluid passages 20.

During the expulsion process, when the plunger 3 is moved to the right, with reference to the drawing, the resilient membrane 16 expands via the action medium 17 by the amount of change in volume produced by the expulsion stroke of the plunger 3. As a result, the fluid introduced into the valve chamber 1 pushes open the valve-piece 9 on the outlet side against the resistance of the valve spring. An amount of fluid equivalent to the amount of change in volume caused by the expansion of the resilient membrane 16 is fed under pressure through the fluid passages 20.

Because the fluid passages 20 are small holes, any solid bodies included in the fluid that are above a set size are excluded by the valve seat 8, so that only smaller solid particles are allowed to pass through the valve device 11. Even if solid bodies should by caught between the valve seat 8 and the valve-piece 9, the valve seat 8 or the valve-piece 9 are formed of a hard resilient material which deforms, thereby enabling the seal to be maintained.

FIGS. 4 to 6 illustrate other embodiments of the present invention. Parts that are the same as those in FIG. 2 are denoted by the same reference numerals.

In the embodiment shown in FIG. 4, the valve seat 8' is covered with a hard resilient material 24 such as hard rubber or synthetic resin. The valve-piece 9' may be covered in the hard resilient material 24 such as shown in FIG. 5, or both the valve seat 8 and valve-piece 9' may be covered by the hard resilient material 24. In FIG. 6, the valve-piece 9 formed of hard resilient material may be combined with a valve seat 8' covered with hard resilient material.

Shown in Table 1 are the combinations of valve-piece 9 and valve seat 8.

TABLE 1

| Valve Piece | Valve Seat | | |
| --- | --- | --- | --- |
| | Made of metal | Formed of hard resilient material | Covered with hard resilient material |
| Made of metal | | O | O |
| Formed of hard resilient material | O | O | O |
| Covered with hard resilient material | O | O | O |

A valve-piece 9, and a valve seat 8, made of wood may also be used in place of the aforementioned hard resilient material. In this case, the water contained in the wooden valve-piece 9 and the valve seat 8 generates a restorative force, so that even if solid bodies are caught between the valve-piece 9 and the valve seat 8, there is little deformation thereof.

The valve-piece 9 may be hemispherical in shape, as shown in FIG. 7, and the curvature may be ellipsoid rather than the curve of a perfect sphere.

The inlet-side valve 9 opens in the direction of the valve chamber 1 is normally kept closed by the force of the valve spring 10 urging it in the direction of the valve seat 8. The outlet-side valve 9' that opens away from the valve chamber 1 is normally kept closed by the force of the valve return spring 10', provided between the valve box 2 and the valve cover 25, that urges the valve 9' towards the valve seat 8'. The numeral 15 denotes the opening formed in the wall 2a of the valve chamber 1.

The plunger 3 is disposed, via a V-shaped packing 13, within a cylinder 14 in the plunger box 4 and is slidably operated by a drive means (not illustrated). In the suction process, the plunger 3 is contained in the cylinder 14, and in the expulsion process, part of the plunger 3 is caused to project from the opening of the cylinder 14 into the pressure action chamber 5.

The pressure action chamber 5 is provided between the opening 15 provided in the wall of the valve chamber 1 of the valve box 2 and the cylinder opening of the plunger box 4. In the pressure action chamber 5, resilient membrane 16 made of sheet rubber, for example, is provided to form a pressure force member that divides the pressure action chamber 5 into a valve box 2 side and a plunger box 4 side. The partitioning resilient membrane 16 is pressed into and around a concave portion 31 formed in the end face of the opening of the box forming the pressure action chamber 5 and is fixed by means of an end-plate 32. On the side of the cylinder 14, the enclosed action chamber A formed by the partitioning resilient membrane 16 is filled with an action medium 17 such as oil, for example.

Figure 10:
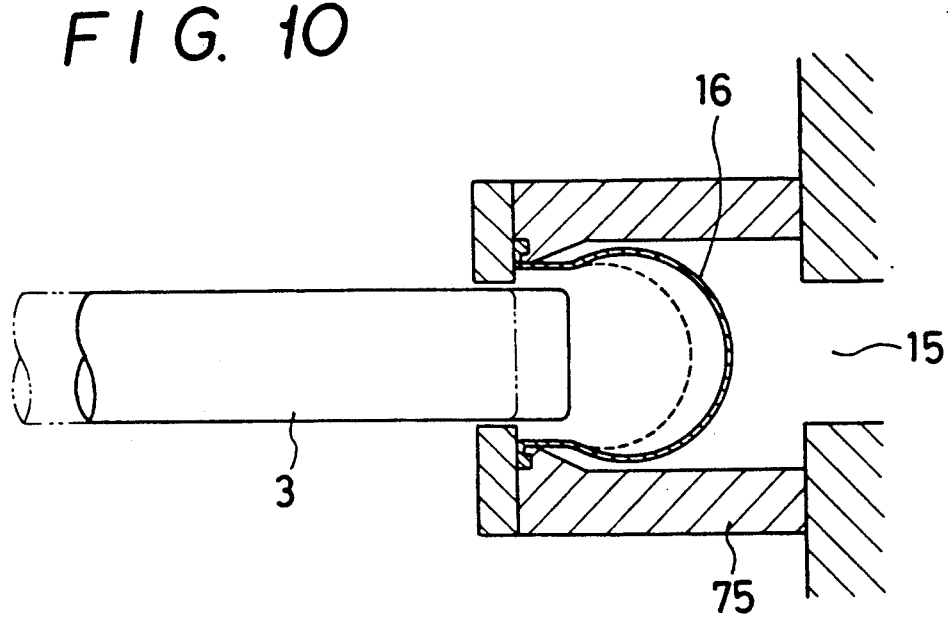
FIG. 10 is an explanatory drawing to explain the operation of the pump apparatus of FIG. 1.

The operation of the pump of the above construction will now be described. When in the course of the suction process the plunger 3 is moved to the left, with reference to FIG. 10, the resilient membrane 16 contracts by the amount of change in volume caused by the suction action of the plunger 3. This produces a negative pressure in chamber 1, forcing open the valve-piece 9 against the resistance of the valve spring 10, and the fluid substance flows into the valve chamber 1 via the fluid passages 20.

During the expulsion process, when the plunger 3 is moved to the right, with reference to the drawing, the resilient membrane 16 expands via the action medium 17 by the amount of change in volume produced by the expulsion stroke of the plunger 3. As a result, the fluid introduced into the valve chamber 1 pushes open the valve-piece 9' on the outlet side against the resistance of the valve spring 10', sending through a fixed amount of fluid under pressure.

Figure 11:
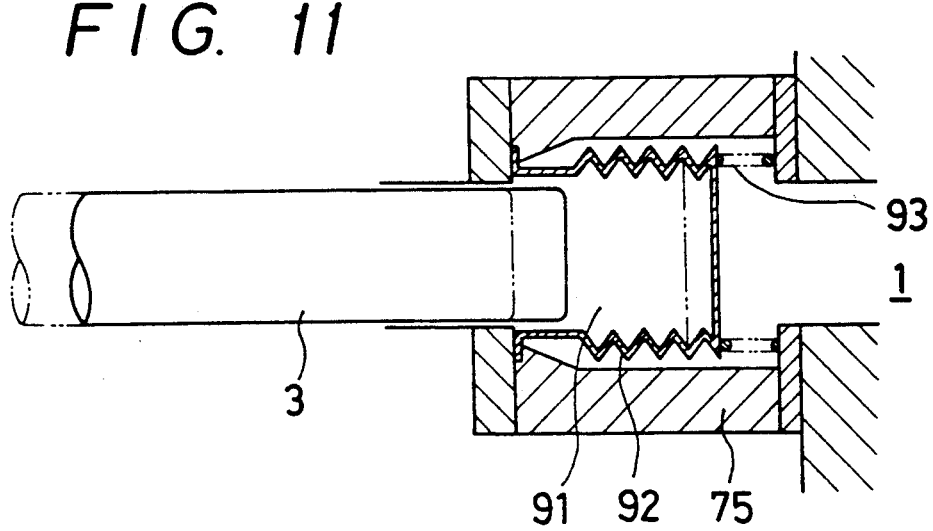
FIG. 11 is a cross-sectional view of a portion of another embodiment.
Figure 12:
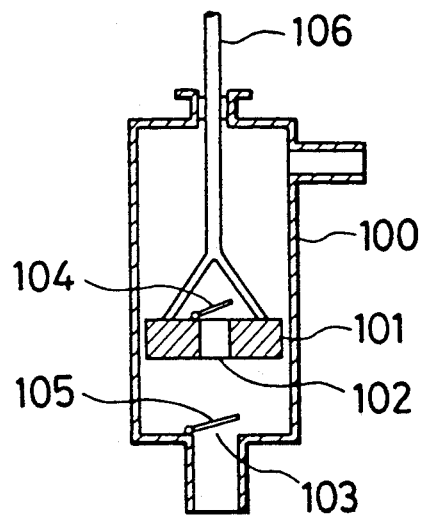
FIGS. 12 to 14 are cross-sectional views of conventional pump apparatuses.
Figure 13:
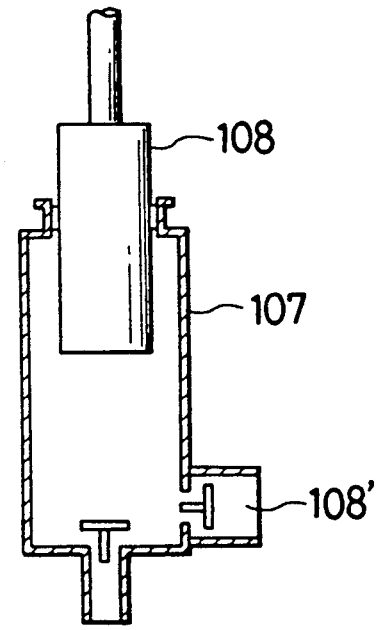
Figure 14:
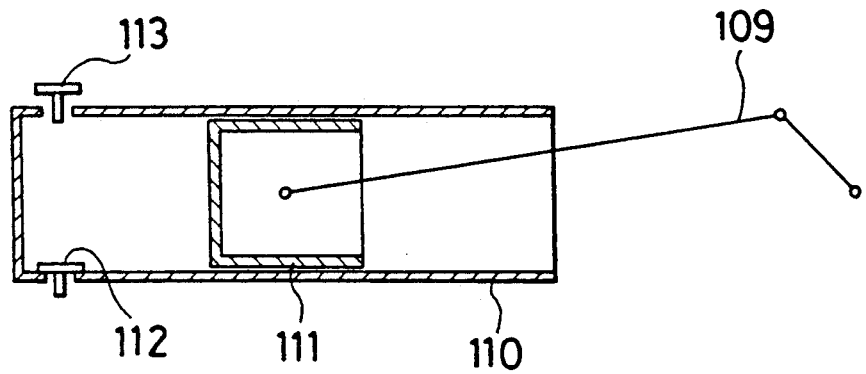

FIG. 11 illustrates another embodiment of the invention. Here, a bellows member 92 is used as the pressure force member. Similarly to the preceding embodiments, the inside of the bellows member 92 is filled with an action medium 17 such as oil. Numeral 93 denotes a return spring for the bellows member 92.

In this embodiment during the suction process of the plunger 3, the bellows member 92 is contracted by the spring 93, drawing the fluid substance into the valve chamber 1. In the expulsion process of the plunger 3, the bellows member 92 is expanded via the action medium 17, and an amount of fluid equivalent to the amount of change in the volume thereof is fed under pressure.

As has been described in the foregoing similarity to previously described valve and pump apparatus according to the present invention, the valve seat and/or the valve-piece are resilient, and the opening and closing action is therefore not obstructed even if solid bodies are caught between the valve seat and the valve-piece. Also, a multiplicity of fluid passages are formed in the valve seat, and the small sectional area of each of these passages enables large solid bodies to be excluded. In addition to this, it is difficult for the valve seat and valve-piece to be damaged by solid bodies or the like, which increases durability. Use of a wooden valve seat or valve-piece is cheaper and more economical than making them from metal.

With the valve and pump apparatus according to the present invention the fluid can be fed under pressure by changes in the volume of a pressure force member, so that the packing used to maintain the watertightness of the reciprocating member does not come into contact with the fluid. In the case of pressurized pumping of, for example, cement-mill materials and the like, this helps to increase the durability because there is no risk of the seal being damaged. Furthermore, the location of the pressure action chamber between the valve chamber and the cylinder is highly economical, because it can be used with a conventional plunger and other pumps without modification. The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A valve device comprising:
    a valve seat having a seating portion which has a recess defined therein having a generally spherical surface;
    a prescribed number of fluid passages being formed in the valve seat, said passages being open into the recess;
    a valve-piece having a surface corresponding to the surface of the valve seat recess; and a valve spring that resiliently urges the valve-piece toward the surface of the valve seat recess;

wherein at least one of the valve seat and valve-piece is formed of a hard resilient material.

2. The valve device according to claim 1 wherein the flow passages are reticular in shape.

3. The valve device according to claim 1 wherein the flow passages are slit-shaped.

4. The valve device according to claim 1 wherein the valve-piece is generally spherical in shape.

5. The valve device according to claim 1 wherein the hard resilient material is a hard rubber.

6. The valve device according to claim 1 wherein the hard resilient material is a synthetic resin.

7. A valve device comprising:
a valve seat having a seating portion which has a recess defined therein having a generally spherical surface;
a prescribed number of fluid passages being formed in the valve seat, said passages being open into the recess;
a valve-piece having a surface corresponding to the surface of the valve seat recess; and
a valve spring that resiliently urges the valve-piece toward the surface of the valve seat recess;
wherein at least one of the valve seat and valve-piece is covered with a hard-resilient material.

8. The valve device according to claim 7 wherein the flow passages are reticular in shape.

9. The valve device according to claim 7 wherein the flow passages are slit-shaped.

10. The valve device according to claim 7 wherein the valve-piece is generally spherical in shape.

11. The valve device according to claim 7 wherein the hard resilient material is a hard rubber.

12. The valve device according to claim 7 wherein the hard resilient material is a synthetic resin.

13. A valve device comprising:
a valve seat having a seating portion which has a recess defined therein having a generally spherical surface;
a prescribed number of fluid passages being formed in the valve seat, said passages being open into the recess;
a valve-piece having a surface corresponding to the surface of the valve seat recess; and
a valve spring that resiliently urges the valve-piece toward the surface of the valve seat recess;
wherein one of the valve seat and valve-piece is formed of a hard resilient material and the other is covered with a hard resilient material.

14. The valve device according to claim 13 wherein the flow passages are reticular in shape.

15. The valve device according to claim 13 wherein the flow passages are slit-shaped.

16. The valve device according to claim 13 wherein the valve-piece is generally spherical in shape.

17. The valve device according to claim 13 wherein the hard resilient material is a hard rubber.

18. The valve device according to claim 13 wherein the hard resilient material is a synthetic resin.

19. A valve device comprising:
a valve seat having a seating portion which has a recess defined therein having a generally spherical surface;
a prescribed number of fluid passages being formed in the valve seat, said passages being open into the recess;
a valve-piece having a surface corresponding to the surface of the valve seat recess; and
a valve spring that resiliently urges the valve-piece toward the surface of the valve seat recess;
wherein at least one of the valve seat and valve-piece is made of wood.

20. The valve device according to claim 19 wherein the flow passages are reticular in shape.

21. The valve device according to claim 19 wherein the flow passages are slit-shaped.

22. The valve device according to claim 19 wherein the valve piece is generally spherical in shape.

23. The valve device according to claim 2 wherein the valve-piece is generally spherical in shape.

24. The valve device according to claim 3 wherein the valve-piece is generally spherical in shape.

25. The valve device according to claim 2 wherein the hard resilient material is a hard rubber.

26. The valve device according to claim 3 wherein the hard resilient material is a hard rubber.

27. The valve device according to claim 4 wherein the hard resilient material is a hard rubber.

28. The valve device according to claim 2 wherein the hard resilient material is a synthetic resin.

29. The valve device according to claim 3 wherein the hard resilient material is a synthetic resin.

30. The valve device according to claim 4 wherein the hard resilient material is a synthetic resin.

31. The valve device according to claim 8 wherein the hard resilient material is a hard rubber.

32. The valve device according to claim 9 wherein the hard resilient material is a hard rubber.

33. The valve device according to claim 10 wherein the hard resilient material is a hard rubber.

34. The valve device according to claim 8 wherein the hard resilient material is a synthetic resin.

35. The valve device according to claim 9 wherein the hard resilient material is a synthetic resin.

36. The valve device according to claim 10 wherein the hard resilient material is a synthetic resin.

37. The valve device according to claim 14 wherein the valve-piece is generally spherical in shape.

38. The valve device according to claim 15 wherein the valve-piece is generally spherical in shape.

39. The valve device according to claim 14 wherein the hard resilient material is a hard rubber.

40. The valve device according to claim 15 wherein the hard resilient material is a hard rubber.

41. The valve device according to claim 16 wherein the hard resilient material is a hard rubber.

42. The valve device according to claim 14 wherein the hard resilient material is a synthetic resin.

43. The valve device according to claim 15 wherein the hard resilient material is a synthetic resin.

44. The valve device according to claim 16 wherein the hard resilient material is a synthetic resin.

45. The valve device according to claim 20 wherein the valve-piece is generally spherical in shape.

46. The valve device according to claim 21 wherein the valve-piece is generally spherical in shape.

47. A valve device comprising:
a valve seat having a seating portion which has a recess defined therein having a generally spherical surface;
a prescribed number of fluid passages being formed in the valve seat, said passages being open into the recess;

a valve-piece having a surface corresponding to the surface of the valve seat recess; and a valve spring that resiliently urges the valve-piece toward the surface of the valve seat recess;

wherein at least one of the valve seat and valve-piece is formed of or covered by a hard resilient material.

48. The valve device as recited in claims 47, wherein the hard resilient material is selected from the group consisting of rubber, synthetic resin and wood.

* * * * *